United States Patent [19]

Steiner et al.

[11] Patent Number: 4,727,522

[45] Date of Patent: Feb. 23, 1988

[54] METHOD OF, AND CIRCUIT ARRANGEMENT FOR, FUNCTION CONTROL OF ULTRASONIC ALARM INSTALLATIONS

[75] Inventors: Peter Steiner, Jona; Rudolf Genähr, Männedorf; David Siegwart, Meilen, all of Switzerland

[73] Assignee: Cerberus AG, Männedorf, Switzerland

[21] Appl. No.: 783,230

[22] PCT Filed: Feb. 7, 1985

[86] PCT No.: PCT/EP85/00036

§ 371 Date: Sep. 23, 1985

§ 102(e) Date: Sep. 23, 1985

[87] PCT Pub. No.: WO85/03590

PCT Pub. Date: Aug. 15, 1985

[30] Foreign Application Priority Data

Feb. 13, 1984 [CH] Switzerland .................. 761/84

[51] Int. Cl.$^4$ .............................................. G08B 13/16
[52] U.S. Cl. ...................................... 367/94; 340/515; 340/540
[58] Field of Search ............... 360/94, 93; 340/540, 340/515

[56] References Cited

U.S. PATENT DOCUMENTS

| | | | |
|---|---|---|---|
| 3,383,678 | 5/1968 | Palmer | 367/94 |
| 3,932,870 | 1/1976 | Shapiro et al. | 340/554 |
| 4,482,889 | 11/1984 | Tsuda et al. | 367/94 |

FOREIGN PATENT DOCUMENTS 612026 6/1979 Switzerland .
1006362 9/1965 United Kingdom .

*Primary Examiner*—Glen R. Swann, III
*Attorney, Agent, or Firm*—Werner W. Kleeman

[57] ABSTRACT

In an ultrasonic alarm installation ultrasonic waves are continuously emitted into a monitored region and a frequency shift due to a moving object, e.g. an intruder, by virtue of the Doppler effect is evaluated for giving an alarm signal. The function control in this installation occurs during a test phase by means of brief aperiodic modulation of the emitted ultrasonic waves. The resulting brief frequency broadening generates in the same evaluating circuit a signal if the installation is functioning correctly. The time duration of the aperiodic modulation is selected to be so short that no standing waves can form, so that the function control can also work faultlessly if the installation, because of vectorial addition of the received ultrasonic waves, accidentally is in an insensitive state. Thus even coverings of the ultrasonic transmitter during a sabotage attempt can be recognized and distinguished from an insensitive state.

21 Claims, 9 Drawing Figures

METHOD OF, AND CIRCUIT ARRANGEMENT FOR, FUNCTION CONTROL OF ULTRASONIC ALARM INSTALLATIONS

CROSS-REFERENCE TO RELATED APPLICATION

The present application is related to the commonly assigned, copending U.S. application Ser. No. 06/782,716, filed Sept. 23, 1985, and entitled METHOD OF, AND CIRCUIT ARRANGEMENT FOR, FUNCTION CONTROL OF ULTRASONIC ALARM INSTALLATIONS.

BACKGROUND OF THE INVENTION

The present invention relates to a new and improved method of, and circuit arrangement for, testing, i.e. controlling the function of an ultrasonic alarm installation.

Generally speaking, the method of the present invention includes the steps of emitting ultrasonic waves of a predetermined frequency from an ultrasonic transmitter into region or space to be monitored. An ultrasonic receiver receives ultrasonic waves from the monitored region or space and converts the received ultrasonic waves into an electrical signal which is supplied to an electrical evaluation circuit. This evaluation circuit triggers an alarm signal upon a predetermined frequency deviation between the received ultrasonic waves and the emitted ultrasonic waves. A frequency deviation corresponding to an alarm condition is also generated during a test phase and simulates an alarm signal.

Such a method is known, for example, from Swiss Patent No. 612,026. Therein the fact is utilized that a person moving within the monitored region causes, due to the Doppler effect, a frequency shift in a part of the ultrasonic waves by an amount which corresponds to the person's speed of movement. This frequency shift is signaled by the evaluation circuit as an alarm condition. To this end, the frequency of the received ultrasonic waves is continuously compared with the transmitting frequency and an alarm signal is triggered at frequency deviations which are characteristic for a moving person, as described for example in Swiss Patent No. 556,070.

In the method described in Swiss Patent No. 612,026 a function control of the ultrasonic alarm installation is achieved due to the fact that during a test phase there is not utilized the pure transmitting frequency but a modulated oscillation as the comparison frequency of the receiver. The modulation is selected such that, after mixing with the receiver signal, a Doppler signal develops which corresponds to that of a moving person. Also the propagation time difference between the ultrasonic waves travelling through the monitored space and an electrical reference signal which is transmitted directly from the transmitter to the receiver or to the evaluation circit, can be utilized for the function control.

These known ultrasonic alarm installations in which ultrasound of a predetermined frequency is continuously emitted into the monitored region, however, have the disadvantage that a standing wave field is formed in the monitored region or space. Due to such standing wave field, the waves reflected at various points vectorially add to the emitted waves at the receiver and yield a receiver signal depending upon the amplitude and phase relationship. Depending upon the arrangement of the reflecting objects in the monitored region or space and the environmental conditions, the receiver signal may therefore vary within wide limits from zero to a maximum. Additionally, the signal continuously changes within wide limits, for example, due to environmental conditions such as temperature fluctuations, changes in the air humidity, or the air pressure. The sensitivity fluctuates correspondingly and uncontrollably during the test phase. In the presence of a weak receiver signal the multiplication with a modulated reference signal, however, also produces only a weak Doppler signal so that the function control becomes ineffective. Therefore even changes in the emitted ultrasonic power, e.g. due to covering of the transmitter during a sabotage attempt, cannot be distinguished from such accidental fluctuations of the receiver signal.

SUMMARY OF THE INVENTION

Therefore, with the foregoing in mind, it is a primary object of the present invention to provide a new and improved method of testing or controlling the function of an ultrasonic alarm installation and which method does not exhibit the aforementioned drawbacks and shortcomings of the prior art methods.

Another and more specific object of the present invention aims at providing a new and improved method of testing or controlling the function of an ultrasonic alarm installation and which method is as universally applicable as possible and to a wide extent independent of environmental conditions.

A further important object of the present invention aims at providing a new and improved method of testing or controlling the function of an ultrasonic alarm installation and which method permits reliably recognizing and with the least possible circuit complications, an attempt to sabotage and render ineffective or insensitive the ultrasonic alarm installation.

Yet a further significant object of the present invention aims at providing a new and improved construction of a circuit arrangement of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the method of the present development is manifested by the features that the frequency of the emitted ultrasonic waves is aperiodically modulated for a short interval of time during the test phase in such a manner that the frequency band resulting from the brief aperiodic modulation encompasses the frequency deviation or shift which is evaluated for triggering the alarm.

As alluded to above, the invention is not only concerned with the aforementioned method aspects, but also relates to a novel construction of a circuit arrangement for carrying out the same. Generally speaking, the inventive circuit arrangement comprises an ultrasonic transmitter for emitting ultrasonic waves of a predetermined frequency into a region or space to be monitored, an ultrasonic receiver for receiving ultrasonic waves from the monitored region or space, and an electrical evaluation circuit connected to the ultrasonic receiver for triggering an alarm signal upon a predetermined frequency deviation between the received ultrasonic waves and the emitted ultrasonic waves.

To achieve the aforementioned measures, the inventive circuit arrangement, in its more specific aspects, comprises:

modulating means for aperiodically modulating the predetermined frequency of the ultrasonic waves emitted by the ultrasonic transmitter for a modulation time interval such that the frequency band formed as a result of such aperiodic modulation, includes the predetermined frequency deviation effective for triggering an alarm signal by the evaluation circuit.

In such circuit arrangement the fact is utilized that, during an aperiodic modulation of the predetermined or base frequency, the Fourier analysis apart from the base frequency also encompasses adjacent frequencies so that there is formed an entire frequency band or spectrum. When the aperiodic modulation is suitably selected it can be achieved that these adjacent frequencies, which occur during the brief period of modulation, fall just into the range of frequency deviations or shifts caused by a moving person. Thus such modulation caused frequency deviations or shifts can be processed by the same evaluation circuit as the variations in the Doppler frequency. During the operating phase an alarm is signalled by the evaluation circuit, however, the operability is signalled during the test phase.

Advantageously the aperiodic modulation may comprise a single rectangular or sinusoidal pulse or pulse series. During the modulation the predetermined or base frequency can be selectively switched off. Also, the pulses as such again may be suitably modulated.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
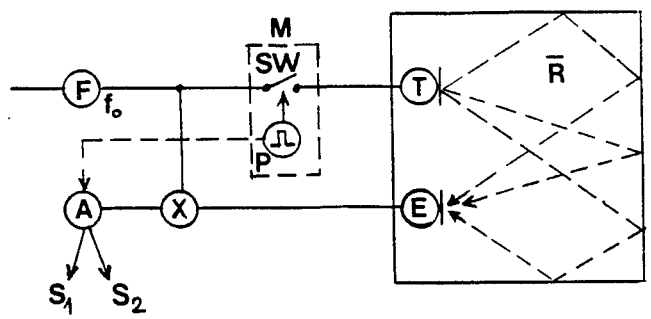
FIG. 1 is a schematic block circuit diagram of a first exemplary embodiment of the inventive ultrasonic alarm installation.

Describing now the drawings, it is to be understood that to simplify the showing thereof only enough of the structure and operation of the circuit arrangement for testing or controlling the function of an ultrasonic alarm installation has been illustrated therein as is needed to enable one skilled in the art to readily understand the underlying principles and concepts of this invention. Turning now specifically to FIG. 1 of the drawings, in the ultrasonic alarm installation illustrated therein by way of example and not limitation, ultrasonic waves are emitted by an ultrasonic transmitter T into a monitored region or space $\overline{R}$. After reflection from walls, barriers or objects in the monitored region or space $\overline{R}$ the ultrasonic waves are received by an ultrasonic receiver E and converted into an electrical signal which is supplied to an electrical evaluation circuit A.

In the normal operating state, the ultrasonic transmitter T is controlled by a frequency generator F operating at a predetermined or base frequency $f_o$ and caused to continuously emit ultrasound or ultrasonic waves at this frequency $f_o$, e.g. 20 kHz. As long as there is no movement within the monitored region or space $\overline{R}$, the ultrasonic receiver E receives only ultrasound or ultrasonic waves of this predetermined or base frequency $f_o$. At the output of a series-connected mixer or mixing means or multiplier X, which is likewise controlled by the frequency generator F, there occurs no differential frequency or frequency deviation so that the evaluating circuit A does not detect a frequency deviation or shift and does not produce a signal.

As soon, however, as there is any movement in the monitored region or space $\overline{R}$, for example, by an intruder, the ultrasonic receiver E receives, in addition to the radiation or ultrasonic waves at the predetermined or base frequency $f_o$, ultrasonic waves of a frequency which is shifted depending upon the speed of movement of the intruder according to the Doppler effect. At the predetermined or base frequency $f_o$ and the practically occurring movement speeds of persons, this frequency deviation or shift is in the range of 0 to at least 500 Hz. The evaluating circuit A now evaluates the electrical signal generated by the ultrasonic waves received by the ultrasonic receiver E by passing through a mixer or mixing means X in a manner which is known as such. There is thus detected the presence of such frequency deviations or shifts and, if necessary, triggered an alarm signal $S_1$. In this way, additionally, other criteria can be taken into consideration in order to eliminate disturbing influences.

For the purpose of testing or function control of the ultrasonic alarm installation, the ultrasound or ultrasonic waves emitted by the ultrasonic transmitter T are aperiodically modulated for a predetermined period or modulation time interval using the modulating means or device M, which contains a pulse generator P and a switch or switch means SW in the illustrated first exemplary embodiment of the inventive ultrasonic alarm installation shown in FIG. 1. The type of this modulation is selected such that the frequency band or spectrum of the ultrasonic waves is widened in relation to the base frequency $f_o$ and includes adjacent frequencies encompassing the Doppler shifts evaluated by the evaluating circuit A for signal generation. Therefore the evaluating circuit A in this case responds not only to Doppler frequency shifts caused by a moving intruder during the normal operating phase, but also to the reception of ultrasonic waves which are modulated in this manner during the test phase, without the necessity of circuit alterations. It is merely convenient to provide an additional control for the evaluation circuit A by means of the pulse generator P. so that the alarm signals $S_1$ can be distinguished from a ready-to-function signal $S_2$. The duration of the aperiodic modulation must be selected so short that the transient build-up events are not yet terminated and that no standing waves can be formed. It is thus ensured that the ready-to-function signal $S_2$ is also produced if during the operating phase, as a result of the initially described vectorial addition of the reflected ultrasonic waves of varying phase relationship, the received ultrasonic signal accidentally is weak or almost zero. Due to the short time duration of the test modulation, there is also in this case reliably triggered the ready-to-operate signal $S_2$ provided there is no disturbance. A sabotage attempt by covering the ultrasonic transmitter T would be detected as a disturbance, even if the system accidentally is in an insensitive state.

Figure 2:
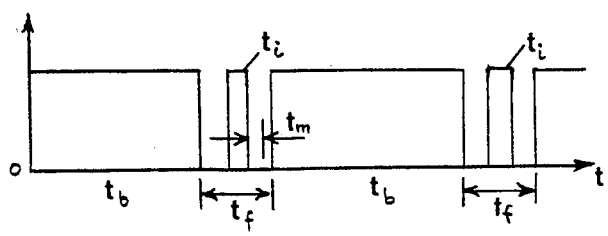
FIGS. 2 and 3 are graphs representing respective time relationships during two possibilities of ultrasound modulation in the ultrasonic alarm installation shown in FIG. 1.

FIG. 2 shows a graph representing the time relationships of a particularly simple aperiodic modulation of the emitted ultrasonic waves and which aperiodic modulation is suited for testing or function control. During a normal operating phase $t_b$, ultrasound or ultrasonic waves of the predetermined or base frequency of, for example, 20 kHz or greater, is continuously emitted. For carrying out the test or function control, the ultrasound is manually, automatically or periodically switched off during a test phase $t_f$ of approximately 300 msec and reactivated during the test phase $t_f$ for a predetermined modulation time interval $t_i$ of approximately 10 msec. This predetermined modulation time interval $t_i$ is so short that no standing waves can form in the monitored region or space $\overline{R}$ during this predetermined modulation time interval $t_i$ but it is longer than the direct ultrasound propagation time of the modulated ultrasonic waves from the ultrasonic transmitter T to the ultrasonic receiver E. An actual measuring period $t_m$ during the test phase $t_f$ advantageously begins only close to the end of the predetermined modulation time interval $t_i$ or shortly thereafter. Yet the predetermined modulation time interval $t_i$ should be short enough for eliminating with respect to the test or function control the direct transmission of ultrasound or ultrasonic waves from the ultrasonic transmitter T to the ultrasonic receiver E or the reflection from very close objects, e.g. covering of the ultrasonic transmitter T under consideration of the lower limit of the Doppler evaluation. Nevertheless the measuring period $t_m$ should also have an upper limit in order to eliminate the effects of objects at great distance and to detect disturbing objects only in proximity and thus a sabotage attempt in the immediate area.

Figure 3:
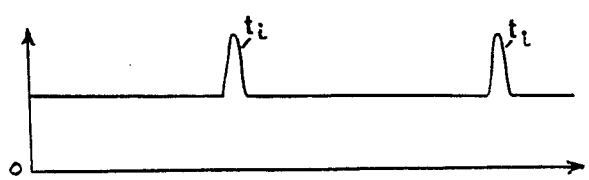

FIG. 3 shows a further graph representing the time relationships of a suitable aperiodic modulation, in which the predetermined or base frequency $f_o$ is not switched off during the test phase $t_f$ but merely the amplitude is raised briefly during the predetermined modulation time interval $t_i$. Instead, the amplitude can also be reduced for a short time period or the frequency or phase relationship can be briefly varied. The effect is analogous to the previously described modulation example as shown in FIG. 2.

Figure 4:
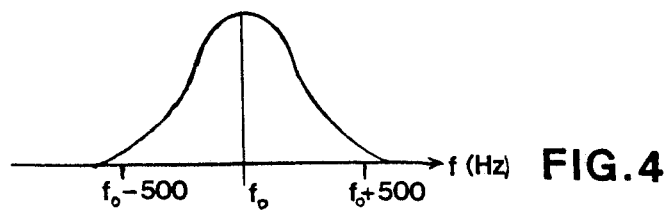
FIG. 4 is a diagram showing the frequency band or spectrum of the ultrasonic waves during modulation according to FIGS. 2 and 3.

In FIG. 4 the frequency band or spectrum is reproduced which is developed during the predetermined modulation time interval $t_i$ of the ultrasonic waves in accordance with the previously described modulation examples shown in FIGS. 2 and 3. This frequency band or spectrum includes not only the predetermined or base frequency $f_o$, but is broadened such that adjacent frequencies are included as well, in the mentioned numerical examples a range of approximately $f_o \pm 500$ Hz. Since the Doppler frequency evaluation normally occurs within the range of approximately 10–500 Hz, the illustrated frequency band or spectrum may be processed for test or function control by the same evaluation circuit A without substantial changes.

Figure 5:
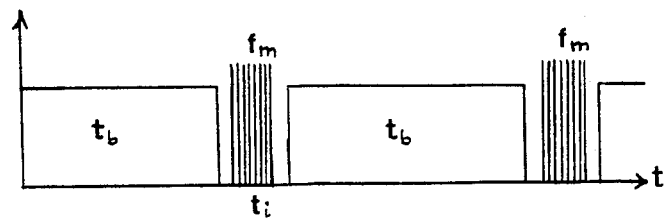
FIG. 5 is a graph representing the time relationship during a further possibility of modulation in the ultrasonic alarm installation shown in FIG. 1.
Figure 6:
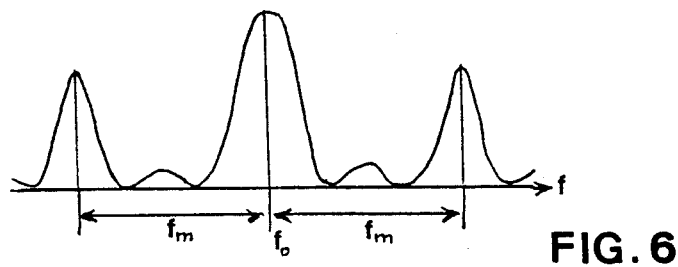
FIG. 6 is a diagram showing the frequency band or spectrum of the ultrasonic waves during modulation according to FIG. 5.

In the graph representing the time relationships during a further possibility of aperiodic modulation shown in FIG. 5, the ultrasonic wave does not consist of a simple predetermined or base frequency $f_o$ during the predetermined modulation time interval $t_i$, but rather of a carrier frequency $f_o$ modulated by a modulation frequency $f_m$. In this case, the frequency spectrum contains, as shown in FIG. 6, a central band around the carrier frequency $f_o$ and side bands at a spacing $f_m$ therefrom and may also contain side bands of a higher order. By suitably selecting the modulation frequency it can be achieved in this example that the side bands are exactly located in a desired evaluation channel associated with the Doppler frequency shift. This can be important in evaluation circuits in which only narrow evaluation channels are provided for reasons of safety from disturbance.

It will be noted that the same effects can also be achieved by means of an amplitude, frequency or phase jump as an aperiodic modulation. Frequency broadening also occurs in such case.

Figure 7:
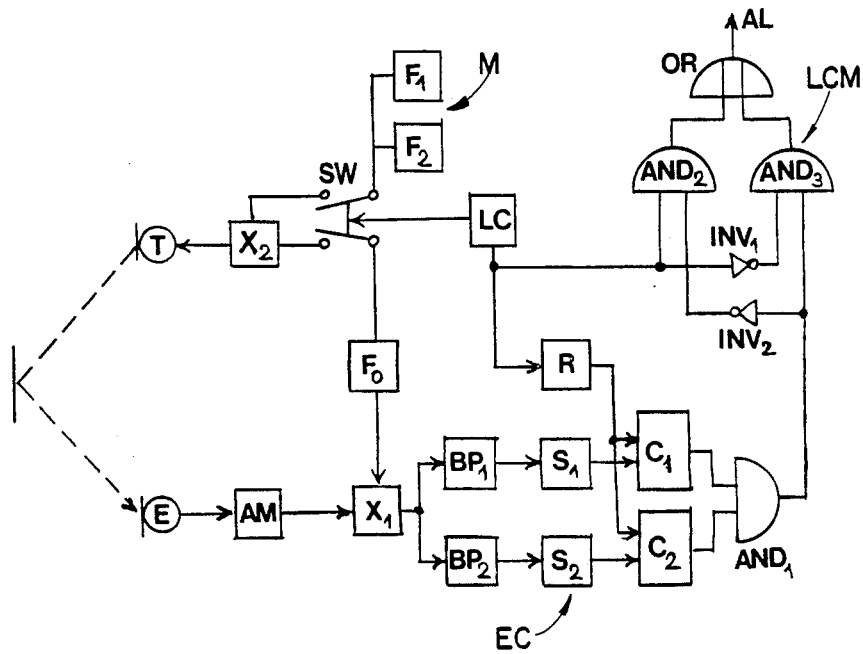
FIG. 7 is a block diagram of a second exemplary embodiment of the inventive ultrasonic alarm installation.

FIG. 7 shows the block circuit diagram of a second exemplary embodiment of the inventive ultrasonic alarm installation containing two Doppler evaluating channels and additionally a test or function control circuit. In this circuit arrangement the ultrasonic transmitter T is controlled by a frequency generator $F_o$ operating at a frequency $f_o$ via a switch or switch means SW and a mixing means or mixer $X_2$. A logic control circuit or unit LC controls the switch or switch means SW as in the previously described embodiment in such a manner that the frequency generator $F_o$ is temporarily switched off and on during the test phase $t_f$. The modulating means M contain two modulation frequency generators $F_1$ and $F_2$ operating at the modulation frequencies $f_{m1}$ and $f_{m2}$ and simultaneously or sequentially connected with the ultrasonic transmitter T during the test phase $t_f$ of the operation. The two modulation frequencies $f_{m1}$ and $f_{m2}$ thereof are selected such that their beat frequencies with the predetermined or base frequency $f_o$ are directly located in both Doppler evaluation channels of the evaluation circuit EC. The electrical signal of an ultrasonic receiver E is conducted to two evaluation channels via an amplifier AM, which may be frequency-selective for the vicinity of $f_o$, and via a mixer or mixing means or multiplier $X_1$ which is likewise controlled by the base frequency generator $F_o$.

The evaluation channels possess related band-passes $BP_1$ and $BP_2$ with different bandwidths for the Doppler frequencies of the mixer or mixing means $X_1$, e.g. a lower range between 20 and 50 Hz and the upper range between 60 and 100 Hz. Furthermore, these evaluation channels comprise related series-connected storage or memory circuits $S_1$ and $S_2$ which may be constructed as integrators holding a signal for a predetermined time, and related comparator circuits $C_1$ and $C_2$. These related comparator circuits $C_1$ and $C_2$ only produce a signal when a reference signal generated by a reference signal generator R, which is changed in a predetermined manner by a logic control circuit or unit LC during the test phase $t_f$, is exceeded during the test phase $t_f$. Both evaluation channels are connected to logic circuit means LCM containing an AND-Gate $AND_1$ which only passes an output signal to a further AND-Gate $AND_3$ when a signal is present in both evaluation channels, i.e. when Doppler frequencies are present in both frequency ranges or both evaluation channels are functioning.

The output signal of the AND-Gate $AND_1$ is then conducted to one input of the AND-Gate $AND_3$. The other input of the AND-Gate $AND_3$ is controlled via an inverter $INV_1$ by the logic control circuit LC. At the same time the output signal of the AND-Gate $AND_1$ is conducted via an inverter $INV_2$ to one input of an other AND-Gate $AND_2$. The other input of the AND-Gate $AND_2$ is directly controlled by the logic control circuit LC. The outputs of both AND-Gates $AND_2$ and $AND_3$ are connected to the inputs of an OR-Gate OR which delivers an output or alarm signal Al when one of the AND-Gates $AND_2$ or $AND_3$ produces an output signal. By means of this circuit it is achieved that, during the normal operating phase in which no test or function control signal is produced and the AND-Gate $AND_2$ is closed whereas the AND-Gate $AND_3$ is opened, the alarm signal AL is triggered via the AND-Gate $AND_3$ if a Doppler signal originating from an intruder exists in both evaluating channels and appears at the output of the AND-Gate $AND_1$.

On the other hand, during the test phase $t_f$, a signal of the logic control circuit LC is present so that the AND-Gate $AND_2$ is opened but the AND-Gate $AND_3$ is closed via the inverter $INV_1$. The generation of the output or alarm signal Al is blocked due to the inverter $INV_2$ when a signal is present at the output of the AND-Gate $AND_1$. This case is realized when the test signal arrives via both evaluating channels. In the event, however, that no output signal appears at the AND-Gate $AND_1$, an output signal AL of the logic circuit means LCM is triggered via the AND-Gate $AND_2$ and signals the inoperability of the ultrasonic alarm installation as a result of, for example, sabotage, component failure or other defects.

By means of the described evaluating circuit EC in conjunction with the logic circuit means LCM the advantages of the multichannel evaluation are preserved. These advantages reside in testing whether, within the holding time of the storage or memory circuits $S_1$ and $S_2$, Doppler signals which are characteristic of the movement of persons, simultaneously or successively occur in both evaluation channels. On the other hand, by means of the same evaluation circuit EC, the function of all components including both evaluation channels, can be simultaneously checked. The inventive concept, however, can also be used for evaluation circuits possessing only one evaluation channel. Other variations are also possible within the scope of the inventive concept.

Figure 8:
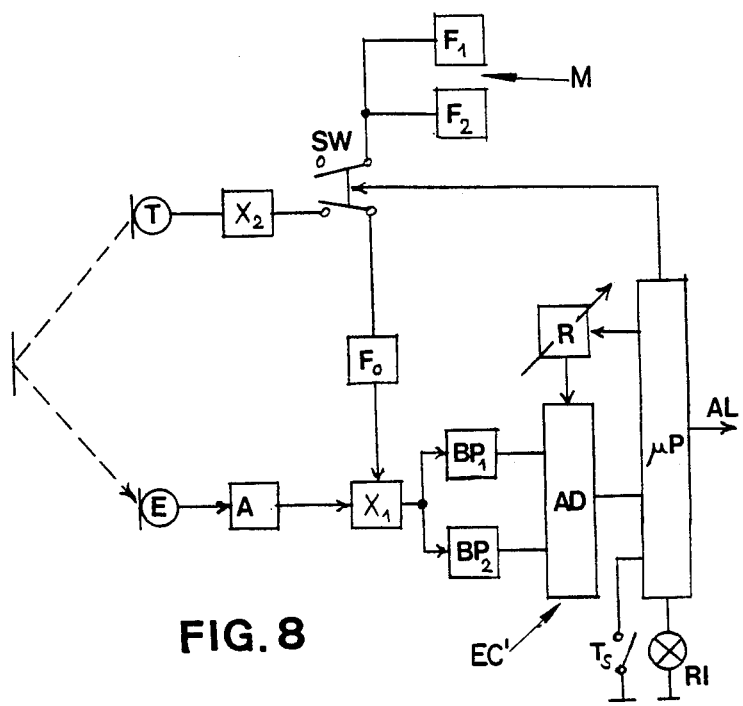
FIG. 8 is a block circuit diagram of a third embodiment of the inventive ultrasonic alarm installation.

FIG. 8 shows a particularly useful and advantageous third embodiment of the inventive ultrasonic alarm installation constituting a further development of the hereinbefore described circuit arrangement shown in FIG. 7 and analogous components are designated herein by the same reference numerals. Instead of discrete components, this circuit arrangement operates using a microprocessor $\mu P$ which is connected in circuit with an evaluation circuit EC' via an analog-to-digital converter AD. With such circuit arrangement, security against sabotage is further enhanced and improved, since the alarm installation can be automatically adapted to altered space conditions, e.g. to changes intentionally made within the monitored region or space $\overline{R}$.

For this purpose and during the test phase $t_f$, the output signals of the two or more band-passes $BP_1$, $BP_2$ ... are converted in the analog-to-digital converter AD to a digital signal and received by the microprocessor $\mu P$. The infeed of the signal to the analog-to-digital converter AD may also be realized by means of a multiplexer connected forwardly thereof. During the start-up of the ultrasonic alarm installation or during a later change of the arrangement in the monitored region or space $\overline{R}$, a preselected signal test phase $t_f$ which is run on demand by the operation of a switch $T_s$. The result which is obtained by combining the results from the various band-passes, is stored in the microprocessor $\mu P$.

Figure 9:
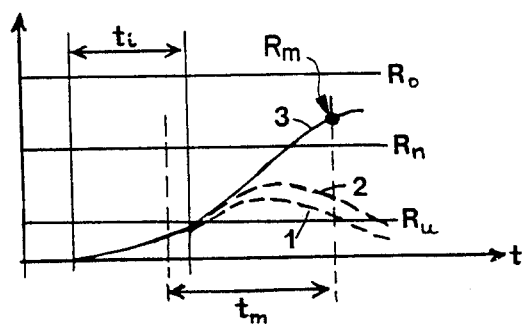
FIG. 9 is a graph representing the time and amplitude relationship of the signal variation in the ultrasonic alarm installation shown in FIG. 8.

As shown in FIG. 9, this combination can be made, for example, in such a manner that the output signals of the band-passes $BP_1$, $BP_2$... and which are reproduced in FIG. 9 by the curves 1 and 2, respectively, are each integrated and added resulting in the curve 3. The end value of the curve 3 at the end of the measuring period $t_m$ represents the result $R_m$ for the microprocessor $\mu P$. The microprocessor $\mu P$ now activates an indicator RI until, by means of alternating or readjusting the reference signal generator R, the reference value measured via the analog-to-digital converter AD conforms with the result of the preselected test phase $t_f$. In operation and at the end of each test phase $t_f$, the actual result which is obtained in the same manner as during start-up, is compared with the result or reference signal $R_n$ which is adjusted at the reference signal generator R and the alarm signal Al is triggered when upper or lower limit values $R_o$ or $R_u$ set in the microprocessor $\mu P$, are exceeded.

While there are shown and described present preferred embodiments of the invention, it is to be distinctly understood that the invention is not limited thereto, but may be otherwise variously embodied and practiced within the scope of the following claims.

Accordingly, what we claim is:

1. A method of testing an ultrasonic alarm installation, comprising the steps of:
   generating ultrasonic waves of a predetermined frequency using an ultrasonic transmitter;
   emitting said ultrasonic waves generated by said ultrasonic transmitter into a predetermined region to be monitored;
   receiving ultrasonic waves reflected from said region by means of an ultrasonic receiver and thereby converting said received ultrasonic waves into an electrical signal;
   feeding said electrical signal to an electrical evaluation circuit;
   processing said electrical signal in said electrical evaluation circuit and thereby triggering an alarm signal upon a predetermined frequency deviation of said received ultrasonic waves from said emitted ultrasonic waves;
   producing said predetermined frequency deviation during a test phase of the operation of the ultrasonic alarm installation;
   said step of producing said predetermined frequency deviation entailing aperiodically modulating said emitted ultrasonic waves for a predetermined modulation time interval such that the frequency spectrum of said emitted ultrasonic waves includes said predetermined frequency deviation;

receiving said emitted aperiodically modulated ultrasonic waves of said frequency spectrum including said predetermined frequency deviation and originating from said monitored region, by means of said ultrasonic receiver and thereby converting said received aperiodically modulated ultrasonic waves into an electrical signal;

feeding said electrical signal caused by said received aperiodically modulated ultrasonic waves to said electrical evaluation circuit; and processing said electrical signal caused by said received aperiodically modulated ultrasonic waves of said frequency spectrum including said predetermined frequency deviation and thereby selectively triggering, by means of said electrical evaluation circuit, one of a "ready-to-function" signal and said alarm signal.

2. The method as defined in claim 1, wherein:

during said step of receiving said ultrasonic waves reflected from said region, also directly receiving ultrasonic waves emitted by said ultrasonic transmitter during a predetermined direct propagation time;

said step of receiving said ultrasonic waves reflected from said region further entailing indirectly receiving said ultrasonic waves which have been emitted by said ultrasonic transmitter into said predetermined region to be monitored, from said predetermined region to be monitored after a predetermined longest possible propagation time; and during said step of aperiodically modulating said emitted ultrasonic waves selecting as said predetermined modulation time interval, a time interval longer than said direct propagation time but shorter than said longest possible propagation time.

3. The method as defined in claim 1, wherein:

said step of aperiodically modulating said emitted ultrasonic waves includes the step of generating an ultrasonic pulse of said predetermined frequency for said predetermined modulation time interval.

4. The method as defined in claim 3, further including the step of:

interrupting said steps of generating and emitting said ultrasonic waves by said ultrasonic transmitter during said test phase of the operation of the ultrasonic alarm installation.

5. The method as defined in claim 4, wherein:

said step of generating said ultrasonic pulse for said predetermined modulation time interval entails modulating said predetermined frequency of said ultrasonic pulse using a predetermined modulating frequency and thereby producing beat frequencies in the range of said predetermined frequency deviation.

6. The method as defined in claim 5, further including the step of:

selecting as said predetermined moment of time which starts said predetermined measuring period, a predetermined moment of time within said predetermined modulation time interval.

7. The method as defined in claim 5, further including the step of:

selecting as said predetermined moment of time which starts said predetermined measuring period, a predetermined moment of time after said predetermined modulation time interval.

8. The method as defined in claim 3, wherein:

said step of generating said ultrasonic pulse for said predetermined modulation time interval entails modulating said predetermined frequency of said ultrasonic pulse using a predetermined modulating frequency and thereby producing beat frequencies in the range of said predetermined frequency deviation.

9. The method as defined in claim 3, wherein:

said step of processing said electrical signal caused by said received aperiodically modulated ultrasonic waves, entails processing of said electrical signals during a predetermined measuring period of a predetermined duration which starts at a predetermined moment of time related to said predetermined modulation time interval and terminates at a predetermined moment of time during said test phase of the operation of said ultrasonic alarm installation.

10. The method as defined in claim 1, wherein:

said steps of generating and emitting said ultrasonic waves entails generating and emitting ultrasonic waves of a predetermined amplitude; and said step of aperiodically modulating said emitted ultrasonic waves entails aperiodically modulating said predetermined amplitude of said ultrasonic waves.

11. The method as defined in claim 10, wherein:

said step of aperiodically modulating said predetermined amplitude of said ultrasonic waves entails aperiodically modulating said predetermined amplitude of said ultrasonic waves by means of an amplitude jump.

12. The method as defined in claim 1, wherein:

said step of aperiodically modulating said emitted ultrasonic waves entails aperiodically modulating said predetermined frequency of said ultrasonic waves.

13. The method as defined in claim 12, wherein:

said step of aperiodically modulating said predetermined frequency of said ultrasonic waves entails aperiodically modulating said predetermined frequency of said ultrasonic waves by means of a frequency jump.

14. The method as defined in claim 1, wherein:

said step of aperiodically modulating said emitted ultrasonic waves entails aperiodically modulating the phase of said ultrasonic waves.

15. The method as defined in claim 14, wherein:

said step of aperiodically modulating said phase of said ultrasonic waves entails aperiodically modulating said phase of said ultrasonic waves by means of a phase jump.

16. A circuit arrangement for testing an ultrasonic alarm installation containing an ultrasonic transmitter for emitting ultrasonic waves of a predetermined frequency into a region to be monitored, an ultrasonic receiver for receiving ultrasonic waves reflected from said region and converting said received ultrasonic waves into an electrical signal, an electrical evaluation circuit connected to said ultrasonic receiver for processing said electrical signal and triggering an alarm signal upon a predetermined frequency deviation of said received ultrasonic waves from said ultrasonic waves emitted by said ultrasonic transmitter, said circuit arrangement comprising:

modulating means for aperiodically modulating the emitted ultrasonic waves for a predetermined modulation time interval during a test phase of the operation of the ultrasonic alarm installation and thereby producing ultrasonic waves of a frequency spectrum including said predetermined frequency deviation during such test phase; and the electrical evaluation circuit processing, during said test phase, an electrical signal caused by the received aperiodically modulated ultrasonic waves of said frequency spectrum including said predetermined frequency deviation and selectively triggering one of a "ready-to-function" signal and the alarm signal.

17. The circuit arrangement as defined in claim 16, further including:

control means controlling the operation of said modulating means; and said modulating means containing switch means controlled by said control means.

18. The circuit arrangement as defined in claim 17, wherein:

said control means interrupts the emission of the ultrasonic waves of the predetermined frequency by the ultrasonic transmitter during said test phase of the operation of the ultrasonic alarm installation; and said control means is operatively coupled to said ultrasonic transmitter and said switch means in order to reactivate said ultrasonic transmitter during said predetermined modulation time interval.

19. The circuit arrangement as defined in claim 17, further including:

mixing means operatively connected to said modulating means and the ultrasonic transmitter;

said modulating means containing at least one modulation frequency generator;

said mixing means mixing, via said switch means, at least one modulation frequency generated by said at least one modulation frequency generator and the predetermined frequency of the emitted ultrasonic waves; and said at least one modulation frequency is selected such that there are generated beat frequencies produced as a result of the frequency mixing operation by said mixing means and emitted by said ultrasonic transmitter and which beat frequencies encompass said predetermined frequency deviation effective for triggering said alarm signal.

20. The circuit arrangement as defined in claim 17, further including:

logic circuit means operatively connected to said electrical evaluation circuit and said control means;

said logic circuit means, during an operative phase of the operation of the ultrasonic alarm installation, transmitting said alarm signal triggered by said electrical evaluation circuit upon said predetermined frequency deviation effective for triggering said alarm signal; and said logic circuit means during said test phase of the operation of the ultrasonic alarm installation, blocking transmission of said "ready-to-function" signal but transmitting an output signal in the absence of said "ready-to-function" signal.

21. The circuit arrangement as defined in claim 16, further including:

a microprocessor operatively connected to said modulating means and connected in circuit in said electrical evaluation circuit;

said microprocessor storing an electrical signal generated by said electrical evaluation circuit during a preselected test phase of the operation of the ultrasonic alarm installation;

said microprocessor comparing said stored electrical signal associated with said preselected test phase, and further electrical signals generated during subsequent test phases of the operation of the ultrasonic alarm installation; and said microprocessor determining the deviation of said further electrical signals from said stored electrical signal and generating said alarm signal upon a deviation in excess of a predetermined value of said deviation.

* * * * *